UNITED STATES PATENT OFFICE.

WILLIAM G. FUERTH, OF NEWARK, NEW JERSEY, ASSIGNOR TO EQUILIBRATOR COMPANY, OF NEWARK, NEW JERSEY, A CORPORATION OF NEW JERSEY.

TYPE-WRITER STENCIL.

1,293,077.   Specification of Letters Patent.   Patented Feb. 4, 1919.

No Drawing.   Application filed October 29, 1912.   Serial No. 728,411.

*To all whom it may concern:*

Be it known that I, WILLIAM G. FUERTH, a citizen of the United States, residing in Newark, in the county of Essex and State of New Jersey, have invented certain new and useful Improvements in Type-Writer Stencils, of which the following is a specification.

This invention relates to stenciling sheets of a kind usually prepared by inserting them in a typewriting machine to make the stencil, which is afterward run through a duplicating machine to produce the inked copies.

A stencil sheet of this kind is usually made of Yoshino paper, and it has been proposed to use an animal gelatin, or a gelatinous derivative of barley, cornstarch, or other farinaceous material for filling up the pores of the paper and making it impervious to ink, such coating material being, however, perforable by the blows of the type of the typewriter, whereby the stencil is cut or made.

Such gelatinous material is of course brittle, and in order to soften it so that the typewriter types may perforate the coating, it has been proposed to employ water, which however is apt to swell the gelatinous material and make it otherwise undesirable for use as a stencil.

The object of my invention is to produce a stencil sheet which will be more durable than the paraffin or wax stencil sheet that is in common use, but which shall not be open to the objections above named, and which shall moreover meet the requirements for a stencil sheet of medium durability, as well as for great durability.

In carrying out my invention, I soak fish-isinglass, prepared from fish bladder, in a little water, which is absorbed by the fish-isinglass, and has the effect of making the latter easily soluble. Then the mixture, so partly prepared, is placed in water and boiled until a thorough solution is made; the proportion of water (including both the initial small quantity of cold water, and the final large quantity of boiling water) being about forty parts by weight to one part of the fish-isinglass.

I preferably use Russia fish-isinglass, owing to its superiority for this purpose to the domestic isinglass, which is made partly from bladders and largely from the other parts of fish. The coating above prepared is preferably applied to the Yoshino sheet over a water bath. It will dry very readily.

In cold weather an ordinary wax sheet is liable to become brittle and easily cracked with attendant disintegration; while in warm climates, the wax is apt to become plastic, and the sheets are apt to stick together and are not easy to handle.

This fish-isinglass meets the peculiar requirements of filling up the pores of the Yoshino sheets for the purpose of making a stencil sheet; the stencil sheet thus produced being thin and extremely flexible, and not liable to crack.

The sheet is rendered extremely tenacious and tough; its tensile strength being much greater than that of sheets coated with a product of farinaceous material or animal gelatin.

The stencil sheet made as above described is dampened preparatory to cutting or preparing the stencil; but, in contradistinction to stencil sheets heretofore proposed, the water merely renders the coating sufficiently plastic, as the water has not the power to dissolve the coating, as is the case with the farinaceous or animal gelatin products aforesaid.

The coating is not apt to stick to the backing sheet, and hence is not apt to come off from the stencil sheet and leave the stencil injured and pervious to ink.

If it is desired to increase the durability of the sheet made as above described, it may be run through a hardening bath, which may be formaldehyde (below twenty-five per cent. and preferably two per cent.). Two per cent. by weight of formaldehyde may be added to the coating solution aforesaid, or the formaldehyde may be added to the sheet after passing through said coating solution. Other ordinary hardening materials well known in the photographic art may be used, such as for instance, hyposulfite of soda, chrome-alum, bichromate of potassium, etc. The stencil coating may be hardened to any desired degree; and those skilled in the art can make their selections as to what strength of coating solution to use.

It will be understood, however, that the use of the hardening agent is not an essential, as the coating of fish-isinglass is normally sufficiently insoluble in cold water to render it suitable for a typewriter stencil.

A hardening bath consisting of two per cent. formaldehyde will make a stencil sheet of more durability than one which is simply coated with the aforesaid solution of fish-isinglass; and for extreme durability a stronger solution of formaldehyde may be employed. Other hardening substances may be employed which are well known to those skilled in the art of photography, including substances that do not change their color or solubility until they are dry.

A hardened sheet prepared according to my invention may be dampened in order to soften the coating for use in the typewriter to make the stencil; but if it is desired, the use of water may in some cases be omitted. The stencil sheet may readily be used with a stylus for autographic work, first moistening the sheet with water, and using any ordinary backing, such for example as paper.

The stencil sheet may be rendered limp and easily operated upon by the typewriter without the use of water, by adding a small quantity of glycerin (*quantum sufficit*) to the solution of fish-isinglass before coating the Yoshino paper. The quantity of glycerin may be varied according to the climate in which the stencil sheet is to be used, and according to the softness desired. Shellac will adhere uniformly and homogeneously to the sheet, which is an advantage in making corrections, etc., as customary on stencil sheets.

The stencil sheets may have the advantage of both glycerin and the hardening substances aforesaid; the glycerin being added to the solution of fish-isinglass, and the hardening agent being added after the sheet is coated with the solution of fish-isinglass and glycerin. The glycerin may be omitted from such sheets as it is desired to make the hardest and most durable.

If a stencil sheet is to be used with a wet backing in the typewriter, a slight infusion of glycerin in the solution of fish-isinglass will render the coating hygroscopic and sufficiently soft.

A stencil sheet prepared according to this invention is not affected by heat, like an ordinary wax stencil sheet. A wax sheet may make from fifty to a few hundred copies, whereas this new sheet can make from one thousand to twenty thousand copies, and can be withdrawn from the stenciling machine and laid between blotters to absorb the stenciling ink, and then preserved for further use.

The wear and tear upon the new sheet, as it is used in a stencil machine, is not so perceptible as in the case of an ordinary wax sheet. The ordinary wax sheet is liable eventually to dissolve in the oil which is an ingredient of the ink. The oil permeates the wax and separates its particles and allows its molecules to cohere so loosely that they adhere to the work-sheet and become detached from the stencil sheet; every work-sheet possibly taking some of the coating off the stencil sheet. A sheet made according to this invention is not subject to this difficulty, because it has a substantially insoluble hard face, which moreover can be made very hard, when desired, in the manner set forth.

My improved stencil sheet has an advantage, inasmuch as the concrete substance derived from fish is not readily soluble when converted into a coating for open fiber paper, for stenciling, so that a moist process used for preparing the improved stencil sheet to receive the type-impressions will not dissolve or carry away enough of the improved coating to render the stencil pervious to ink.

The new sheet may be glycerinated to a slight degree in case it is to be operated upon without the preliminary moistening process. The glycerin renders it hygroscopic.

When typewriting the stencil, I preferably use a broad typewriter ribbon as a backing for the stencil. The ribbon contains a certain percentage of glycerin, which tends to soften the fish-isinglass. Moreover, the operator can see what he is doing, because some of the coloring matter in the ribbon is transferred to the stencil sheet where the types strike.

Glycerin may also be employed at the time that the stencil is being made, by using for a backing a sheet of jaconet or lawn that is saturated with glycerin (either in pure or commercial form). The effect of the glycerin upon the stencil coating will be about the same as that of water; but a much smaller quantity of glycerin will suffice and the glycerin will not ooze out upon the typewriter, as water is apt to do.

A backing sheet may be otherwise prepared, as by saturating it with other hygroscopic substances. Backing sheets prepared with glycerin or other hygroscopic materials may be kept in a pad ready for use. The glycerin backing sheet can be colored with a pigment which will adhere to the stencil sheet where it is struck by the types, so that the operator can readily read the writing on the sheet.

For extremely severe use, as in making stencil cards for addressing machines, a two-ply stencil may be made by uniting two sheets of Yoshino paper by means of a bath of fish-isinglass; and the hardening agent may be added.

Variations may be resorted to within the scope of the invention, and portions of the improvements may be used without others.

Having thus described my invention, I claim:

1. The herein-described process of preparing a stencil sheet, which comprises soaking fish-isinglass in a little water to modify its solubility, treating it with boiling water to make an apparent solution, then coating a sheet of Yoshino paper with said solution, thereby filling the pores of said sheet and rendering the coated sheet extremely tough, flexible, uncrackable and insoluble, supporting said sheet by a fabric backing moistened with glycerin and lying against a firm backing, and then impressing stencil characters by displacing the material of the stencil sheet.

2. The method of preparing a stencil, consisting in typewriting upon the front of the same when supported by an ink ribbon forming a moist backing therefor, to transfer coloring matter from the ribbon to the back of the stencil and render the stencil legible.

3. The method of making a stencil, consiting in typewriting the same against a backing, consisting of an ink ribbon, whereby coloring matter is transferred to the stencil where the type strikes, and renders the stencil legible; the ribbon containing glycerin to soften the coating of the stencil sheet.

4. The method of preparing a stencil, consisting of using a glycerin-impregnated cloth sheet for a backing for the stencil in the typewriter and impressing the types upon the stencil to perforate or stencilize the same, said backing being colored with a pigment which will adhere to the stencil where it is struck by the types, so as to render the writing legible.

5. The herein-described improved laminated stencil, comprising two superposed sheets of Yoshino paper coated with a gelatinous substance formed mainly from a solution of fish-isinglass, said solution forming a bond between the paper sheets and acting both to fill the pores thereof and to render them extremely tough, flexible, uncreasable and insoluble.

6. The herein-described improved laminated stencil, comprising two superposed sheets of Yoshino paper coated with a gelatinous substance formed mainly from a solution of fish-isinglass and treated with a hardening agent, said solution forming a bond between the paper sheets and acting both to fill the pores thereof and to render them extremely tough, flexible, uncreasable and insoluble.

WILLIAM G. FUERTH.

Witnesses:
   Marie B. Stocker,
   William M. Nulton, Jr.